United States Patent [19]

Mankey et al.

[11] Patent Number: 4,625,944

[45] Date of Patent: Dec. 2, 1986

[54] SAFETY DEVICE FOR LIFTING APPARATUS

[75] Inventors: Harry S. Mankey; Charles C. Garner, both of Dallas, Tex.

[73] Assignee: Standard Manufacturing Company, Inc., Dallas, Tex.

[21] Appl. No.: 814,590

[22] Filed: Jan. 2, 1986

Related U.S. Application Data

[63] Continuation of Ser. No. 590,358, Mar. 16, 1984, abandoned, which is a continuation of Ser. No. 467,399, Feb. 17, 1983, abandoned, which is a continuation of Ser. No. 214,750, Dec. 9, 1980, abandoned.

[51] Int. Cl.$^4$ ............................ B60P 1/48; B66F 3/24
[52] U.S. Cl. ................................ 254/8 R; 254/93 R
[58] Field of Search ............ 414/589, 495, 743; 91/420; 254/124, 8 R, 8 B, 8 C, 2 R, 2 B, 2 C, 3 R, 3 B, 3 C, 9 R, 9 B, 9 C, 10 R, 10 B, 10 C, 93 R, 89 H

[56] References Cited

U.S. PATENT DOCUMENTS

| | | | |
|---|---|---|---|
| 2,355,341 | 8/1944 | Trimbach | 254/3 R |
| 2,836,054 | 5/1958 | Brauer | 254/89 H |
| 2,920,773 | 1/1960 | Knabe | 414/743 |
| 2,937,003 | 5/1960 | Croll | 254/93 R |
| 2,956,408 | 10/1960 | Fowler | 91/509 |
| 3,341,042 | 9/1967 | Carder | 254/89 H |
| 3,472,547 | 10/1969 | London | 91/420 |
| 3,758,076 | 9/1973 | Tranchero | 254/8 R |
| 4,223,693 | 9/1980 | Kosarzecki | 91/420 |

Primary Examiner—Robert C. Watson
Attorney, Agent, or Firm—Michael A. O'Neil

[57] ABSTRACT

A safety device is provided for use with a lifting apparatus having a main lifting mechanism for lifting, lowering and supporting a load. The safety device includes a cylinder operatively connected to the lifting apparatus and capable of lifting, lowering and supporting the load supported by the lifting mechanism. The safety device further includes a counterbalance holding valve operatively connected to the cylinder for preventing the lowering of the load supported by the lifting apparatus except in response to the application of hydraulic pressure thereto.

6 Claims, 4 Drawing Figures

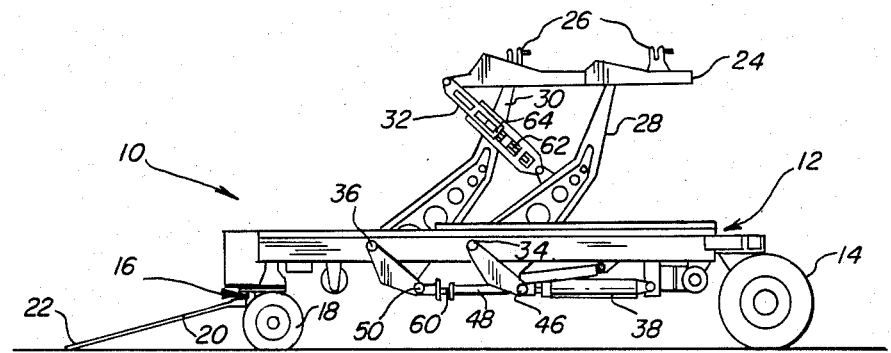
FIG. 1.
PRIOR ART
FIG. 2.
FIG. 3.
FIG. 4.

SAFETY DEVICE FOR LIFTING APPARATUS

CROSS-REFERENCE TO RELATED APPLICATIONS

This application is a continuation of patent application Ser. No. 590,358, filed Mar. 16, 1984, now abandoned, which is a continuation of Ser. No. 467,399, filed Feb. 17, 1983, now abandoned, which in turn is a continuation of patent application Ser. No. 214,750, filed Dec. 9, 1980, now abandoned.

TECHNICAL FIELD

This invention relates to the art of lifting apparatus, and more particularly, to a safety device which is capable of independently lifting, lowering and supporting a load supported by a lifting apparatus. In addition, the device is capable of providing immediate support for the load upon failure of the primary lifting mechanism of the lifting apparatus.

BACKGROUND ART AND SUMMARY

Lifting apparatus of various types have been developed for use in particular applications, whether for lifting a human being or a heavy and unwieldy object. Such lifting apparatus typically utilize one or more well known lifting mechanisms to actuate the lifting apparatus, such as hydraulic, electromechanical and manually-powered systems, for example. However, regardless of the particular application for which the lifting apparatus is adapted or the type of lifting mechanism which it incorporates, there usually exists a potential for either lifting mechanism failure, structural failure of the lifting apparatus, or failure of both, resulting in the abrupt and substantially unrestricted lowering of the load supported by the lifting apparatus. Clearly, the potential for such lifting apparatus failure poses a substantial risk of harming the lifting apparatus, the object or load supported by the apparatus, as well as persons and equipment in proximity to the lifting apparatus.

In an attempt to prevent lifting apparatus from allowing their loads to fall uncontrollably, various safety devices have been developed. An example of one such device is a ratchet mechanism comprising a pawl and rack assembly which allows the lifting apparatus to raise a load without significant resistance, but which automatically engages to prevent downward movement of the load.

Unfortunately, this type of safety device has proven inadequate for a number of reasons. Since the ratchet rack consists of a number of teeth displaced by a predetermined distance, upon failure of the lifting mechanism it is possible for the load to fall some distance before engagement of the pawl with a rack tooth. If the load is sufficiently great, the ratchet pawl will shear as it engages the next rack tooth, thereby causing the lifting apparatus to fail completely. Alternatively, even assuming that the ratchet pawl withstands the stress imposed as it engages a rack tooth, the load may be damaged or become unstable due to the abruptness with which its downward movement is interrupted.

An additional disadvantage of such ratchet mechanisms relates to the actuation of the lifting apparatus once failure of the apparatus has occurred. Since the ratchet is unable to raise or lower the load, the load must remain in the position at which the ratchet engaged following failure of the lifting apparatus. If the lifting apparatus cannot be moved due to the position of the load, repair of the apparatus at an inconvenient and frequently hazardous location may be necessary.

Often, prior art lifting apparatus utilize lifting mechanisms having a number of duplicate components which are substantially equivalent in structure and function and which operate simultaneously to actuate the lifting apparatus. However, such lifting mechanisms do not provide adequate precaution against failure of one or more of the duplicate components because the capacity of each such component is insufficient to support more than its proportionate share of the lifting apparatus load. Therefore, failure of one or more of the duplicate components may increase the load imposed on the operative duplicate components beyond their capacity, causing failure of the entire lifting mechanism.

For example, lifting apparatus having hydraulic lifting mechanisms may utilize two duplicate cylinders positioned in parallel for actuation of the apparatus. In such lifting apparatus, the capacity of each cylinder is approximately one-half of the maximum capacity of the apparatus, each cylinder being incapable of independently actuating the lifting apparatus to lift the maximum design load of the apparatus. If one of the two cylinders were to fail, the remaining cylinder would be incapable of supporting the load by itself.

Accordingly, prior art lifting apparatus safety devices, and the presence of duplicate components in prior art lifting apparatus, will not provide substantially immediate support for the lifting apparatus load upon lifting apparatus failure, the ability to lock the load against vertical movement in virtually any vertical position, nor the capability of independently raising, lowering, and supporting the maximum load for which the lifting apparatus is rated in the event of lifting apparatus failure.

The present invention comprises a lifting apparatus safety device which overcomes these and other disadvantages associated with the prior art. In accordance with broader aspects of the invention, a first and second safety means is provided for use in a lifting apparatus having a main lifting mechanism. The main lifting mechanism is capable of independently lifting, lowering and supporting a predetermined maximum load between first and second positions. The safety device comprises a first safety means including a cylinder operatively connected to the lifting apparatus which is capable of lifting, lowering and supporting the predetermined maximum load between the first and second positions of the lifting apparatus independently of the main lifting mechanism. The safety device further comprises a second safety means including a counterbalance holding valve operatively connected to the cylinder of the first safety means. The valve restricts movement of the cylinder such that the lifting apparatus will lower the load only when the valve is actuated in response to the application of hydraulic pressure thereto.

In accordance with other aspects of the invention, the first safety means includes a double-acting hydraulic cylinder which is operatively connected to the lifting apparatus. The cylinder is capable of exerting sufficient force in a first direction to actuate the lifting apparatus, thereby lifting the load supported by the apparatus independently of the main lifting mechanism. The counterbalance holding valve of the second safety means allows movement of the cylinder in a second direction to lower the load supported by the lifting apparatus only in response to the application of hydraulic pressure to the valve.

One embodiment of the invention may be utilized in a lifting apparatus which includes a frame, at least one lifting member pivotally mounted on the frame for supporting an object, and a main lifting cylinder connected between the frame and the lifting member. Actuation of the main lifting cylinder in a first direction pivots the lifting member and the object into a preselected position, while actuation of the cylinder in the opposite direction lowers the lifting member. The main lifting cylinder has sufficient independent capacity to fully support the lifting member and the object supported thereby. The invention comprises a primary safety cylinder also positioned between the frame and the lifting member and having sufficient independent capacity to fully support the lifting member and the object supported thereby. Actuation of the safety cylinder along with the main lifting cylinder provides continuing support of the lifting member and the object should the main lifting cylinder become inoperative. Operatively connected to the safety cylinder is a counterbalance holding valve for preventing the lifting member and the object supported thereby from moving downwardly. The counterbalance holding valve is released to permit downward movement of the lifting member and the object supported thereby only by applying hydraulic pressure to the valve.

In addition to the use of a counterbalance holding valve with the safety cylinder, the invention may further include a counterbalance holding valve which is operatively connected to the main lifting cylinder of the lifting apparatus to lock the lifting member and the object against downward movement. Release of the counterbalance holding valve is accomplished only by actuating the main lifting cylinder in the direction which lowers the lifting member and the object.

BRIEF DESCRIPTION OF THE DRAWINGS

A more complete understanding of the invention may be had by reference to the following Detailed Description when taken in conjunction with the accompanying Drawings, wherein:

FIG. 1 is a side view of a special weapons trailer in which a lifting cylinder arrangement forming one embodiment of the present invention is employed;

FIG. 2 illustrates a partial side view of a special weapons trailer illustrating the known lifting cylinder arrangement;

FIG. 3 is a partial side view of the special weapons trailer illustrating the lifting cylinder arrangement forming one embodiment of the present invention; and FIG. 4 illustrates schematically the function of the counterbalance holding valve operatively connected to each lifting cylinder.

DETAILED DESCRIPTION

Referring now to the Drawings, wherein like reference characters designate like or corresponding parts throughout several views, FIG. 1 illustrates a special weapons trailer 10 with which the present invention is employed.

The special weapons trailer 10 includes a frame 12 which may be adjusted in width to accommodate a range of load sizes. The frame 12 is supported on rear wheels 14 and a bogie 16 pivotally secured to the frame 12 and including front wheels 18. Bogie 16 also includes a tongue 20 and lunette eye 22 for attachment to a vehicle for towing the trailer 10. The wheels of the bogie 16 may pivot 45 degrees on each side of the longitudinal axis of the trailer to permit the trailer to turn. In addition, the rear wheels 14 and front wheels 18 may be pivoted 90 degrees so that the trailer may move sideways. Each of the rear wheels 14 includes a hydraulic disc aircraft brake actuated by a central master cylinder (not shown). The object to be lifted, typically a nuclear weapon, is supported on aligned parallel platforms 24 (only one platform 24 may be seen in FIG. 1) and secured thereto at pick up points 26. Each platform 24, in turn, is supported on lifting members 28 and 30 on opposite sides of frame 12. An adjustment bracket 32 is pivotally mounted to each platform 24 and a lifting member 28 at its opposite ends. The lifting members 28 and 30 are pivotally mounted on trailer 12 by pivot pins 34 and 36.

With reference now to FIGS. 1 and 3, double acting main lifting cylinders 38 are mounted on both sides of frame 12. Each cylinder 38 is secured at one end to a bracket 40 on frame 12 by a pin 42. The exposed end of the piston 44 of each main lifting cylinder 38 is pivotally secured to a lifting member 28 by pin 46. A connecting shaft 48 is pivotally mounted to each of the lifting members 28 by pins 46 at one end, and at the opposite end to lifting members 30 by pins 50. It can be readily seen that actuation of each main lifting cylinder 38 to retract piston 44 will lift the platform 24 on that side of frame 12. Joint actuation of the main lifting cylinder 38 will lift a weapon on the platforms 24 from near the ground to a preselected position as shown in FIG. 1 for attaching the weapon to an aircraft. Actuation of main lifting cylinders 38 to extend pistons 44 will lower platforms 24 to the ground to receive another weapon.

A double acting secondary lifting cylinder 52 is also provided on each side of frame 12 which may also be employed to assist in lifting and lowering a weapon on platforms 24. One end of each cylinder 52 is connected to brackets 54 on frame 12 by pins 56. The exposed end of piston 58 of each cylinder 52 is pivotally connected to a lifting member 28.

Tilt adjustment 60 on each connecting shaft 48 permits the length of the connecting shaft to be varied, thereby tilting a platform 24 for fine adjustment when lifting a weapon. Each adjustment bracket 32 includes a threaded shaft 62 and threaded coupling 64 which may be used to vary the length of the adjustment bracket 32. Adjustment of both adjustment brackets 32 on a vehicle 10 will either move the weapon forward or rearward on the trailer or permit it to rotate slightly about a vertical axis.

In lifting a weapon into the preselected position, it is critical to reduce the likelihood of a component in the trailer 10 failing and thereby permitting the weapon to drop uncontrollably to the ground. One potential area of difficulty is the failure of a main lifting cylinder or the loss of fluid under pressure to permit a main lifting cylinder to collapse. In the prior art, as illustrated in FIG. 2, a mechanical ratchet lock mechanism 66 was mounted on each side of frame 12. Mechanism 66 was mounted at one end to bracket 68 on frame 12 by a pin 70 and at the opposite end to lifting member 28. As the main lifting cylinders 38 were actuated to raise the weapon, the mechanical ratchet lock mechanisms would prevent the weapon from falling a distance greater than would be necessary for the pawl (not shown) on each rachet lock mechanism from engaging a detent 67.

In the present invention, each main lifting cylinder 38 is operatively connected to a counterbalance holding valve 72 and each secondary lifting cylinder 52 is operatively connected with a counterbalance holding valve 74. Main lifting cylinders 38 and secondary lifting cylinders 52 are each separately capable of supporting the full rated load on the associated platform 24. Therefore, the secondary lifting cylinders 52 are capable of supporting the load if the main lifting cylinders 38 become totally inoperative or are removed from the trailer 10.

The provision of counterbalance holding valves 72 and 74 is also a significant addition to the safe operation of trailer 10. The operation of counterbalance holding valve 72 with regard to each of the main lifting cylinders 38 will be described with reference to the schematic flow diagram shown in FIG. 4. Pressurized fluid from a source within the trailer or elsewhere flows in the line 76, through check valve 78 and into the lifting chamber 80 of main lifting cylinder 38. In lifting chamber 80, the pressurized fluid acts against the piston head 82 of piston 44 to retract piston 44 and lift the weapon to the preselected position. During the lifting of the weapon, if pressurized fluid becomes unavailable in line 76 for any reason, the check valve 78 will prevent flow of fluid from lifting chamber 80 and prevent the weapon from being lowered. When the weapon is lifted to the preselected position, the counterbalance holding valves 72 will maintain the weapon in this position. The only way in which the weapon may be lowered is by flow of pressurized fluid through line 84 into the lowering chamber 86 in main lifting cylinder 38 and flow through line 89 to open counterbalance valve 88. As the fluid enters lowering chamber 86, the pressurized fluid exerts increasing force on the opposite side of piston head 82 but the weapon will not be lowered until the pressure is sufficient to open the counterbalance valve 88 thereby permitting the lowering of the platform 24. The operation of counterbalance holding valve 74 connected with each secondary lifting cylinder 52 is identical to that of a counterbalance holding valve 72 connected to a main lifting cylinder 38. Therefore, should the supply of pressurized fluid to any cylinder 38 or 52 be prevented for any reason or even the supply to all of the cylinders, the counterbalance holding valves will prevent an uncontrolled lowering of a weapon supported by trailer 10.

Although only a single embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

What is claimed is:

1. In a lifting apparatus having a main lifting mechanism capable of independently lifting, lowering and supporting a predetermined maximum load between first and second positions, the improvement comprising:
   a first safety means including a cylinder having a lifting chamber and a lowering chamber, operatively connected to said lifting apparatus and having sufficient capacity for lifting, lowering and supporting said predetermined maximum load between said first and second positions independently of said main lifting mechanism;
   a source of hydraulic fluid;
   a first hydraulic line, having a first portion and a second portion, connected between said source and said lifting chamber, and a second hydraulic line connected between said source and said lowering chamber; and
   a second safety means including a counterbalance holding valve having an inlet connected to said first portion of said first hydraulic line and an outlet connected to said second portion of said first hydraulic line, said counterbalance holding valve also including a control terminal connected to said second hydraulic line, said holding valve for preventing the lowering of said predetermined maximum load except in response to the application of hydraulic pressure to said control terminal via said second hydraulic line.

2. In a lifting apparatus having a main lifting mechanism capable of independently lifting a predetermined maximum load between first and second positions, the improvement comprising:
   a first safety means including a double-acting hydraulic cylinder, having a lifting chamber and a lowering chamber, operatively connected to said lifting apparatus, said cylinder being capable of exerting sufficient force in a first direction to actuate said lifting apparatus to lift said predetermined maximum load independently of said main lifting mechanism;
   a source of hydraulic fluid;
   a first hydraulic line, having a first portion and a second portion, connected between said source and said lifting chamber, and a second hydraulic line connected between said source and said lowering chamber; and
   a second safety means including a counterbalance holding valve having an inlet connected to said first portion of said first hydraulic line and an outlet connected to said second portion of said first hydraulic line, said valve also including a control terminal connected to said second hydraulic line, said valve preventing movement of said cylinder in a second direction except in response to the application of hydraulic pressure to said control terminal via said second hydraulic line such that said cylinder is actuated in said second direction.

3. An apparatus for use in a vehicle for lifting an object to a preselected position, said vehicle including a frame, a platform for supporting the object thereon, at least one lifting member mounted to said frame for supporting said platform, and a main lifting mechanism connected between said frame and said lifting member, actuation of said main lifting mechanism in a first direction lifting an object supported on said platform to the preselected position and actuation of said main lifting mechanism in the opposite direction lowering said platform, said main lifting mechanism having a predetermined independent capacity for fully supporting the object without regard to any other structure, said apparatus comprising:
   primary safety means including a safety cylinder, having a lifting chamber and a lowering chamber, connected between said frame and said lifting member, actuation of said safety cylinder in the first direction lifting an object supported on said platform and actuation of said safety cylinder in the opposite direction lowering said platform so that control of the object on said platform is maintained should said main lifting mechanism fail, said safety cylinder having a predetermined capacity sufficient to support an object independently of the main lifting mechanism;

a source of hydraulic fluid;

a first hydraulic line, having a first portion and a second portion, connected between said source and said lifting chamber, and a second hydraulic line connected between said source and said lowering chamber; and second safety means including a counterbalance holding valve having an inlet connected to said first portion of said first hydraulic line and an outlet connected to said second portion of said first hydraulic line, said valve also including a control terminal connected to said second hydraulic line, said valve for preventing downward movement of an object supported on said platform except in response to the application of hydraulic pressure to said control terminal via said second hydraulic line.

4. An apparatus for substitution for a mechanical ratchet lock mechanism in a vehicle for lifting an object to a preselected position, said vehicle including a frame, a platform for supporting the object thereon, at least one lifting member pivotally mounted to said frame for supporting said platform, and a main lifting cylinder connected between said frame and said lifting member, actuation of said main lifting cylinder in a first direction lifting an object supported on said platform to the preselected position and actuation of said main lifting cylinder in the opposite direction lowering said platform, said main lifting cylinder having a predetermined independent capacity for fully supporting the object without regard to any other structure, said apparatus comprising:

primary safety means including a redundant safety cylinder, having a lifting chamber and a lowering chamber, also connected between said frame and said lifting member, actuation of said redundant safety cylinder in a first direction lifting an object supported on said platform and actuation of said redundant safety cylinder in the opposite direction lowering said platform so that control of the object on said platform is maintained should said main lifting cylinder fail, said redundant safety cylinder also having a predetermined independent capacity for supporting the object without regard to any other structure;

a source of hydraulic fluid;

a first hydraulic line, having a first portion and a second portion, connected between said source and said lifting chamber, and a second hydraulic line connected between said source and said lowering chamber; and secondary safety means including a counterbalance holding valve having an inlet connected to said first portion of said first hydraulic line and an outlet connected to said second portion of said first hydraulic line, said valve also including a control terminal connected to said second hydraulic line, said valve for preventing downward movement of said lifting member and said object except in response to the application of hydraulic pressure to said control terminal via said second hydraulic line.

5. The apparatus as described in claim 4 wherein the primary safety means includes a counterbalance holding valve hydraulically connected to said main lifting cylinder to lock the lifting member and the object against downward movement except in response to hydraulic pressure actuating the main lifting cylinder in the lowering direction.

6. In an apparatus for lifting an object to a preselected position of the type including a frame, at least one lifting member pivotally mounted on said frame for supporting the object, and a main lifting cylinder connected between said frame and said lifting member, actuation of said cylinder in a first direction pivoting said lifting member and lifting the object into the preselected position and actuation of said cylinder in the opposite direction lowering said lifting member, said main lifting cylinder have sufficient independent capacity to fully support the lifting member and the object supported, the improvement comprising:

primary safety means including a redundant safety cylinder, having a lifting chamber and a lowering chamber, also positioned between said frame and said lifting member, said redundant safety cylinder also having sufficient independent capacity to fully support the lifting member and object supported thereby, said redundant safety cylinder actuated in said first direction along with said main lifting cylinder for providing continuing support of said lifting member and said object should said main lifting cylinder become inoperative;

a source of hydraulic fluid;

a first hydraulic line, having a first portion and a second portion, connected between said source and said lifting chamber, and a second hydraulic line connected between said source and said lowering chamber; and secondary safety means including a counterbalance holding valve having an inlet connected to said first portion of said first hydraulic line and an outlet connected to said second portion of said first hydraulic line, said valve also including a control terminal connected to said second hydraulic line, said valve for locking the lifting member and object against downward movement except in response to hydraulic pressure except in response to the application of hydraulic pressure to said control terminal via said second hydraulic line.

* * * * *